United States Patent
Kinoshita et al.

[11] Patent Number: 5,932,941
[45] Date of Patent: Aug. 3, 1999

[54] SPINDLE MOTOR AND METHOD OF MANUFACTURING THE SAME

[75] Inventors: Shinji Kinoshita; Shinji Ota; Hiromitsu Gotoh, all of Nagano, Japan

[73] Assignee: Sankyo Seiki Mfg. Co., Ltd., Nagano-ken, Japan

[21] Appl. No.: 08/882,806

[22] Filed: Jun. 26, 1997

[30] Foreign Application Priority Data

Jul. 1, 1996 [JP] Japan ..................... 8-170995

[51] Int. Cl.⁶ ............... H02K 1/27; H02K 1/28; H02K 21/22

[52] U.S. Cl. ............... 310/44; 310/67 R; 310/261

[58] Field of Search ............... 310/89, 261, 44, 310/67 R; 360/99.04, 99.08, 98.07; 29/596, 598

[56] References Cited

U.S. PATENT DOCUMENTS

| | | | |
|---|---|---|---|
| 4,063,939 | 12/1977 | Weaver et al. ............... | 75/208 |
| 5,400,197 | 3/1995 | Jabbari et al. ............... | 360/99.08 |
| 5,517,374 | 5/1996 | Katakura et al. ............... | 360/28.07 |
| 5,557,487 | 9/1996 | Elsaesser et al. ............... | 360/99.08 |
| 5,572,078 | 11/1996 | Saichi et al. ............... | 310/90 |
| 5,659,217 | 8/1997 | Petersen ............... | 310/156 |
| 5,729,404 | 3/1998 | Dunfield et al. ............... | 360/99.08 |

FOREIGN PATENT DOCUMENTS

| | | |
|---|---|---|
| 8-106712 | 4/1996 | Japan . |
| 8-116641 | 5/1996 | Japan . |
| 8-116642 | 5/1996 | Japan . |
| 8-116643 | 5/1996 | Japan . |

*Primary Examiner*—Thomas M. Dougherty
*Assistant Examiner*—Tran N Nguyen
*Attorney, Agent, or Firm*—McAulay Nissen Goldberg Kiel & Hand, LLP

[57] ABSTRACT

A spindle motor comprises a motor shaft, which is rotatably supported by a motor frame via a bearing and a hub, which is formed integral with the motor shaft for securing a data disk. The hub is made of a powder metallurgical product and is bonded with the motor shaft by sintering.

6 Claims, 3 Drawing Sheets

SPINDLE MOTOR AND METHOD OF MANUFACTURING THE SAME

BACKGROUND OF THE INVENTION a) Field of the Invention

The present invention relates to a spindle motor which is used for data disk drive systems for driving data disks such as floppy disks, CD-ROMs. More specifically, it relates to a bonding structure for a hub and a motor shaft or a motor frame and a motor shaft in a spindle motor.

b) Description of the Related Art

Popular spindle motors, used in a data disk drive system include the "rotary shaft" type and "fixed shaft" type. In the "rotary shaft" type, a hub for securing a data disk is attached to a motor shaft which is rotatably supported by the motor frame. In the "fixed shaft" type, a hub is rotatably supported by a motor shaft which is fixed onto a motor frame. In each type, a data disk is driven in sequence, then a spindle motor is driven to rotate a hub on which the data disk is secured.

Now, the hub, or motor frame and motor frames are made from different members and have different rigidity, hardness, and accuracy. In general, they are manufactured separately and are mutually bonded by means of adhesive bonding, press-fitting or shrink-fitting.

On the other hand, a spindle motor in which a motor shaft is formed integral with a hub, is disclosed in Japanese patent Kokai H4-244756.

The bonding structure of conventional technology in which a motor shaft and a hub or a motor frame are made up of different members has the following problems. First, in order to ensure the bonding strength between these members, a large fitting area is required between these members. If a motor shaft of the "straight" type, whose outer diameter is identical to other members is used, the outer diameter is kept constant. In order to increase the fitting area, the fitting portion needs to be larger in the axial direction. As a result, a longer motor shaft will be required. The thickness of the motor shaft is limited by applications to a given dimension. If a longer motor shaft is used, a thinner bearing will be required for supporting the motor shaft. A thinner bearing unfavorably decreases the rigidity of the motor shaft.

A "step motor shaft" which has a fitting portion of a larger diameter may provide the larger fitting area without increasing its length. However, the "step motor shaft" is extremely expensive compared to the "straight" motor shaft. This significantly increases the price of a spindle motor.

On the other hand, when the motor shaft is formed integral with a hub, the following problems will be encountered. That is, some space is required near the border between the hub and motor shaft such that a cutting tool can machine thereon. It is difficult to machine a motor shaft which is formed integral with a hub. The motor shaft may not be machined with a desired accuracy. Also, integrating a motor shaft and hub takes a long time, which is inefficient in terms of productivity. As a result, a spindle motor whose motor shaft is formed integral with a hub become expensive.

OBJECT AND SUMMARY OF THE INVENTION

The present invention addresses these problems. The primary object of the present invention is to provide a spindle motor and a method of manufacturing it to provide a structure strong enough to bond the hub and motor shaft or a motor frame and motor shaft without increasing the bonding area between the members.

In accordance with the invention, a spindle motor comprises a motor shaft, which is rotatably supported by a motor frame via a bearing and a hub, which is formed integral with the motor shaft for securing a data disk. The hub is made of a powder metallurgical product and is bonded with the motor shaft by sintering.

BRIEF DESCRIPTION OF THE DRAWINGS

In the drawings:

FIG. 1 (B) is a cross section of a hub and a motor shaft which are mutually bonded by sintering;

FIG. 3 (B) is a cross section of a hub and a motor shaft which are mutually bonded by sintering.

DESCRIPTION OF THE PREFERRED EMBODIMENTS

The preferable modes of embodiment of the present invention are described by referring to drawings herein.

Figure 1A:
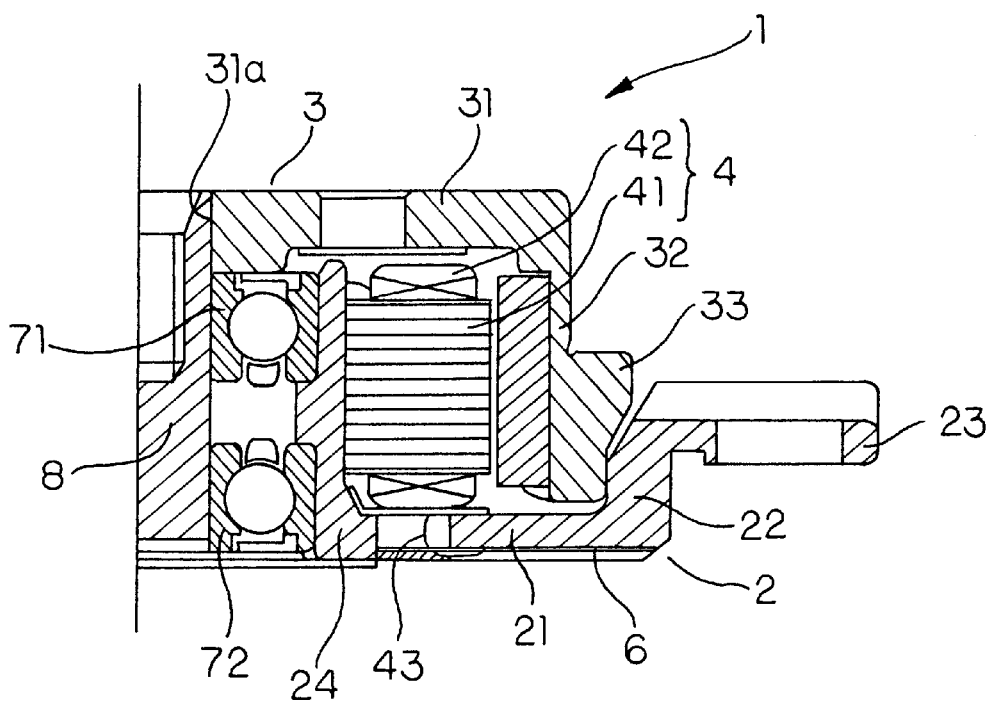
FIG. 1 (A) is a cross section of a spindle motor of the "rotary shaft" type to which the present invention is applied.
Figure 1B:
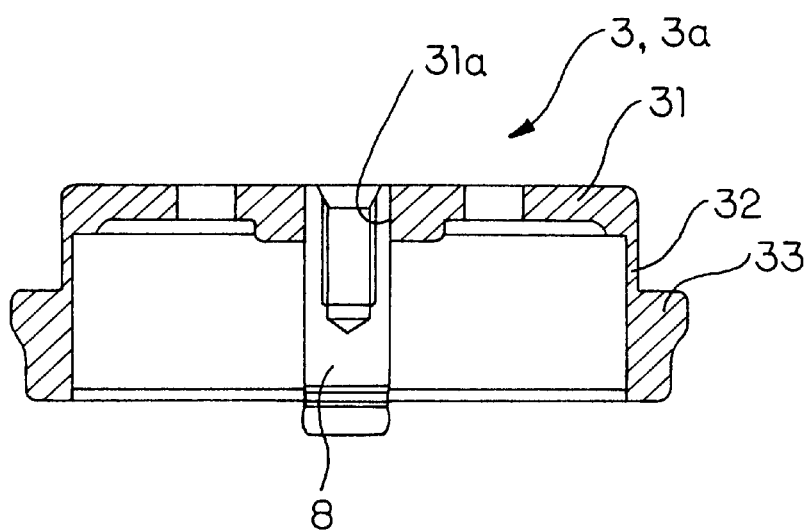

FIG. 1 (A) is a cross section of a spindle motor of the "rotary shaft type" to which the present invention is applied. FIG. 1 (B) shows a hub and a motor shaft which constitute the spindle motor. As shown in these figures, the spindle motor comprises a motor frame 2 and a hub 3 which is rotatably supported by the motor frame 2.

The motor frame 2 comprises:

a bottom portion 21, a outer periphery portion 22, which is cylindrical and extends from the outer peripheral end of the bottom portion 21 in the motor shaft direction, a flange 23, which projects outwardly from the upper end of the outer periphery portion 22, and an inner periphery portion 24 which is cylindrical and vertically extends from the center of the bottom portion 21 into the motor shaft direction. The flange 23 is used as a mounting portion on which a data drive system is mounted. The spindle motor can be mounted in the data drive system via the flange 23 on the motor frame 2.

A hub 3 is made of a powder metallurgical product of aluminum or stainless steel and it comprises:

a top plate portion 31, which is shaped as a disk, an outer periphery portion 32, which is cylindrical and extends from the outer periphery of the top plate portion 31 in the motor shaft axial direction, and a flange 33, which projects from the lower end of the outer periphery portion 32 to the outside. A shaft hole 31 a is formed in the center of the top plate 31, onto which the top of the motor shaft 8, which extends downwardly in the motor shaft direction, is sintered.

A motor shaft 8 is made of the same metallic material as the hub 3. The motor shaft 8 is inserted into the inner hollow section of the inner periphery portion 24 of the motor frame 2. A hub 3 is rotatably supported on the motor frame 2 around the motor shaft 8 by a pair of ball bearings 71, 72, which are fitted between inside of the inner periphery portion 24 and the motor shaft 8.

A center hole of a data disk (not illustrated) which is designed to fit the cylindrical outer periphery portion 32 of a hub 3, functions as a guide for a data disk, which is secured on the hub 3. A data disk is loaded onto the flange 33 of the hub 3, the loading unit.

On the outside of the inner periphery portion 24 of the motor frame 2, a stator core 4 is mounted such that it surrounds the inner periphery portion 24 concentrically. The stator core 4 is formed by laminating a core plate multiple times and has a plurality of salient poles 41, which extends around the center radially. A coil 42 is wound around the salient pole 41. One end of the coil 42 is drawn as a lead wire 43 and is connected to a print circuit board 6, which is mounted outside of the bottom portion 21 of the motor frame 2. A rotor magnet 5 (not in FIG. 1) is fixed inside the outer periphery portion 32 using an adhesive and the like and spaced closely to the outer periphery of the stator core 4.

In the spindle motor 1 of the present invention, power supplied to the coil 42 is controlled through the lead wire 43 to rotate hub 3 on which a rotor magnet is mounted, and which is integral with motor shaft 8.

As described, in the spindle motor 1 of the present invention, hub 3 is bonded to the top of the motor shaft by sintering. These members are bonded in the following manner.

Figure 2:
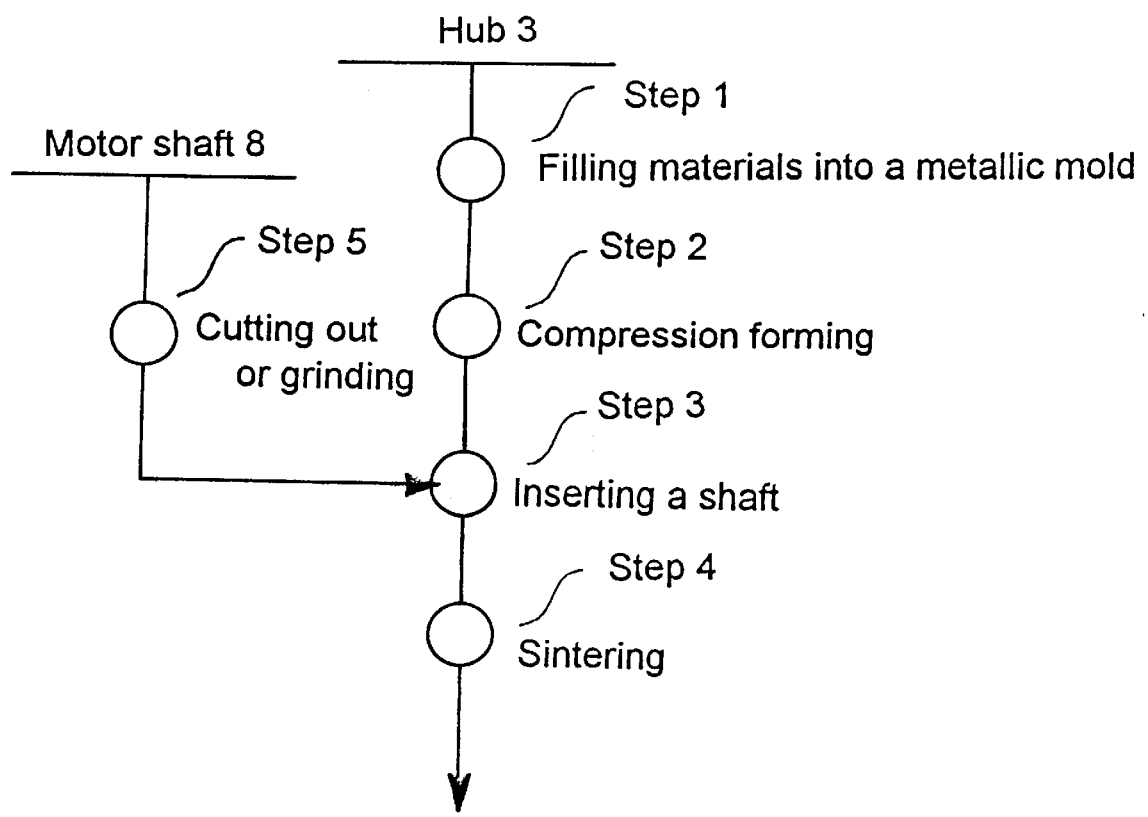
FIG. 2 is a flow chart showing the sintering process step for bonding a hub and motor shaft of the present invention.

FIG. 2 shows the sintering bonding process steps for these members. According to the drawing, aluminum or stainless steel powder (powder metallurgical material) is first filled into a metallic mold.

Then, a press powder hub 3a is formed by "press processing" (step 2). As a result, as is apparent from FIG. 1 (B), a pressed powder hub 3a is obtained. The pressed powder hub 3a comprises:
  a top plate portion 31,
  an outer periphery portion 32,
  a flange 33, and
  a shaft hole 31a, which goes through the center of the top portion 31.

On one hand, a motor shaft 8 is made of the same metallic material such as powder metallurgical material (step 5). The motor shaft 8 can be formed by machining or grinding.

Next, the top of the motor shaft 8 is inserted into the shaft hole 31a of the press powder hub 3a (step 3).

Next, the motor shaft 8, which is inserted into the shaft hole 31a of the press powder hub 3a, is placed in an oven to sinter it at a temperature which is appropriate for the material (step 4). As a result, the shaft hole 31a is shrunk. Then, each of the structures, the inner periphery of the shaft hole 31a and the outer periphery of the motor shaft 8, diffuse into each other and the two structures are integrated. In this way, the hub 3 and the motor shaft 8 are mutually bonded by sintering.

As described in the spindle motor 1 of the present invention, the hub 3 and the motor shaft 8 are bonded by sintering, not by means of adhesive bonding, press-fitting, or shrink-fitting. The sintering bonding is so strong that even if the same bonding area is provided for adhesive bonding or press-fitting, stronger bonding forces can be obtained between the hub 3 and the motor shaft 8. Therefore, there is no need for using a motor shaft 8 which is longer or has a larger diameter in order to increase the fitting area for stronger bonding between the hub 3 and the motor shaft 8. This eliminates the need for thinning the ball bearing 71, 72. This avoids decreasing rigidity of the motor shaft 8 thus providing a spindle motor 1 of excellent speed accuracy.

In the spindle motor 1 of the present invention, a hub 3 and a motor shaft 8 are bonded by sintering. Compared to the process in which a hub 3 and a motor shaft 8 are formed integral from a single member, sintering is simpler and excels in productivity. As a result, an inexpensive spindle motor 1 can be provided.

Embodiment 2

Figure 3A:
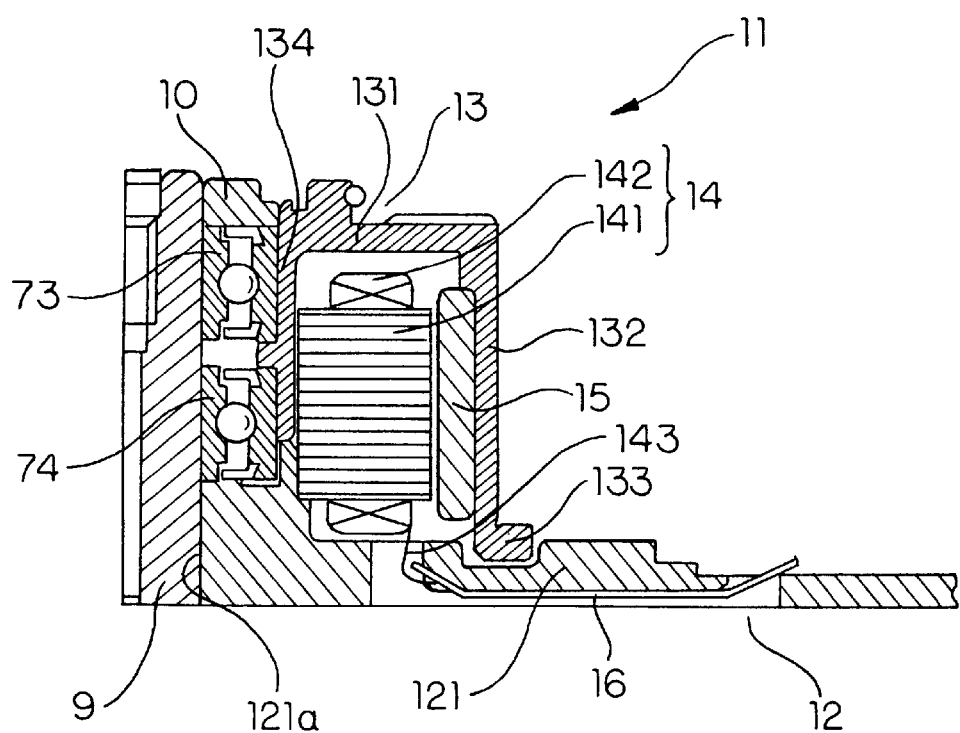
FIG. 3 (A) is a cross section of a spindle motor of the "fixed shaft" type to which the present invention is applied.
Figure 3B:
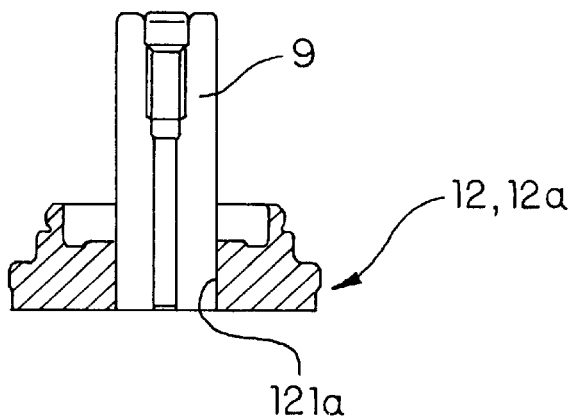

FIG. 3 (A) shows a spindle motor of the "fixed shaft" type to which the present invention is applied. FIG. 3 (B) shows a hub and a motor shaft which constitute the spindle motor. As shown in these figures, a spindle motor 11 comprises a motor frame 12 which is integral with a chassis and a hub 13 which is rotatably attached to the motor frame 12. The motor frame 12 has a bottom portion 121 which is almost a flat plate. A shaft hole 121a is formed in the center of the bottom portion 121 where the lower end of the motor shaft 9, which projects in the motor shaft direction pointing upwardly, is bonded by sintering thereon.

A hub 13 comprises:
  a top plate portion 131, which is shaped as a disk, an outer periphery portion 132, which is cylindrical and extends from the outer periphery of the top plate portion 131 in the motor shaft direction, and a flange 133, which projects from the bottom end of the outer periphery portion 132 to the outside, and
  an inner periphery portion 134, which is cylindrical and extends from the center of the top plate portion downward in the motor shaft direction.

In the hollow portion inside the inner periphery portion 134 of the hub 13, a pair of ball bearings 73, 74 are fitted therein along the motor shaft direction. A motor shaft 9 is fitted along the inner circles of these ball bearings 73, 74. The hub 3 is rotatably supported with respect to the motor frame 12 around the motor shaft 9 by these ball bearings 73, 74. Note that on the upper end of the inner periphery portion 134, a labyrinth seal 10 is attached in order to prevent contamination due to dust or lubricant etc. which may be coming out from the ball bearings 73, 74.

The outer periphery portion 132 functions as a guide for loading a data disk not illustrated at a given position on the hub 13 in the same manner as the outer periphery portion 32 of the hub is described in Embodiment 1. The flange 133 of the hub 13 functions, in the same manner as Embodiment 1, as the loading portion on which a floppy disk or CD-ROM and the like are loaded.

Outside of the inner periphery portion 134 of the motor frame 2, a stator core 14 is mounted such that it surrounds the inner periphery portion 134 concentrically. The stator core 14 comprises a plurality of salient poles 41, which extend around the center radially. A coil 142 is wound around the salient poles 41. One end of the coil 142 is drawn as a lead wire 143 and is soldered to a print circuit board 16. A rotor magnet 15 is fixed inside the outer periphery portion 132 using an adhesive and the and spaced closely to the outer periphery of the stator core 4.

A bonding technique for the motor frame 12 and motor shaft 9 is described herein. However, it is basically the same as the sintering performed for the hub 3 and motor shaft 8 in Embodiment 1, therefore, its detail is not described. Regarding the manufacturing process flow chart for the motor frame 12 and motor shaft 9, the hub in FIG. 2 should read the motor frame 12.

First, aluminum or stainless steel powder (powder metallurgical material) is filled into a metallic mold to "press mold" the motor frame 12 (step 1 and step 2). As a result, as shown in FIG. 3 (B), a motor frame press powder 12a which has a bottom portion 121 and a shaft hole 121a in its center is formed.

Also, a motor shaft 9 is formed of the same metallic material as the above powder metallurgical materials (step 5).

Next, the lower end of the motor shaft 9 is inserted into the shaft hole 121*a* of the motor frame pressed powder 12*a*. They are placed in an oven to sinter at a temperature which is appropriate for the material (step 3 and step 4). As a result, the motor frame 12 and the motor shaft 8 are mutually bonded by sintering.

As described, in the spindle motor 1 of the present invention, the hub 3 and the motor shaft 8 are bonded by sintering, not by means of adhesive, press-fitting, or shrink-fitting. The bonding force for the hub 3 and the motor shaft 8 is as strong as that for the motor frame 12 and the motor shaft 8. Therefore, there is no need for using a motor shaft 8 which is longer or which has a larger diameter in order to increase the bonding area between the motor frame 12 and the motor shaft 9. This eliminates the need for the spindle motor 11 to have thinner ball bearings 73, 74. This avoids decreasing rigidity of the motor shaft 8, thus providing a spindle motor 1 of excellent speed accuracy.

Manufacturing of the spindle motor 11 of the present invention is, as in the same manner as Embodiment 1, simpler and excels in productivity. As a result, an inexpensive spindle motor 11 can be provided.

As described, the present invention employs a bonding method for joining a motor shaft and hub or a motor frame in which two separate members are mutually bonded by sintering. Therefore, if the bonding area is equal, the present invention can provide significantly stronger bonding than adhesive bonding or press-fitting of conventional technology. This eliminates the necessity of increasing length or outer diameter of a motor shaft. In addition, sintering bonding is simple and excellent in production, thus providing an easy bonding inexpensively.

While the foregoing description and drawings represent the preferred embodiments of the present invention, it will be obvious to those skilled in the art that various changes and modifications may be made therein without departing from the true spirit and scope of the present invention.

What is claimed is:

1. A spindle motor, comprising:

a motor shaft, which is rotatably supported by a motor frame via a bearing; and a hub, which is formed integral with said motor shaft for securing a data disk;

wherein said motor shaft and said hub are made of the same powder metallurgical material and are bonded together by sintering.

2. The spindle motor as set forth in claim 1 wherein the powder metallurgical material used for said hub and motor shaft is aluminum.

3. The spindle motor as set forth in claim 1 wherein the powder metallurgical material used for said hub and motor shaft is stainless steel.

4. A spindle motor, comprising:

a motor shaft which is fixed to a motor frame; and a hub which is rotatably supported by said motor shaft via a bearing for securing a data disk;

wherein said motor frame and motor shaft are made of the same powder metallurgical material and are bonded together by sintering.

5. The spindle motor as set forth in claim 4 wherein the powder metallurgical material which said motor frame and motor shaft are made of is aluminum.

6. The spindle motor as set forth in claim 4 wherein the powder metallurgical material which said motor frame and motor shaft are made of is stainless steel.

* * * * *